H. M. DUBOIS.
Hubs for Vehicles.
No. 135,470. Patented Feb. 4, 1873.
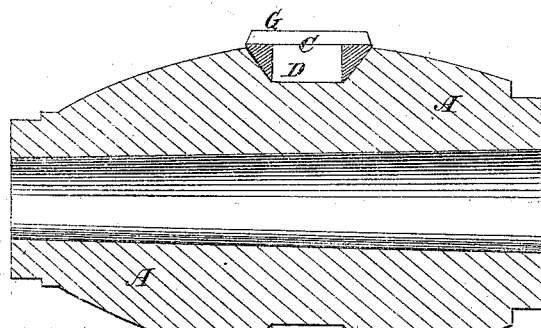
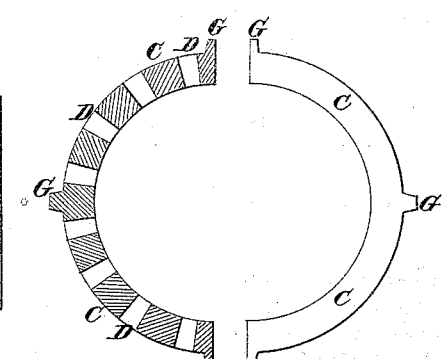
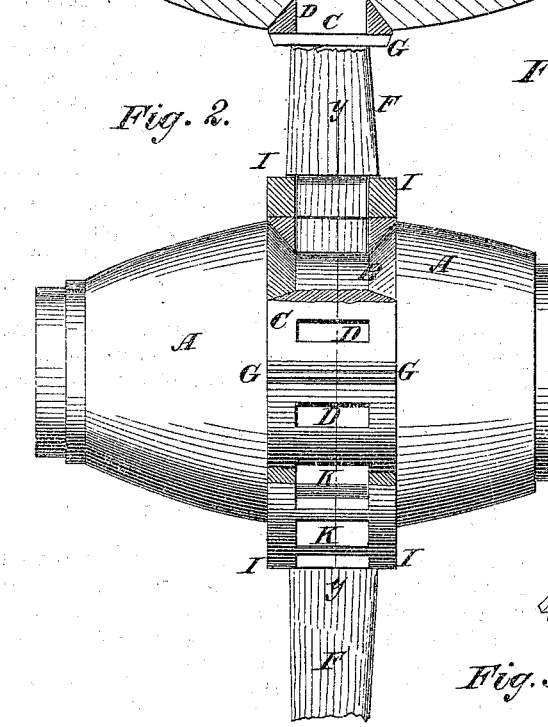
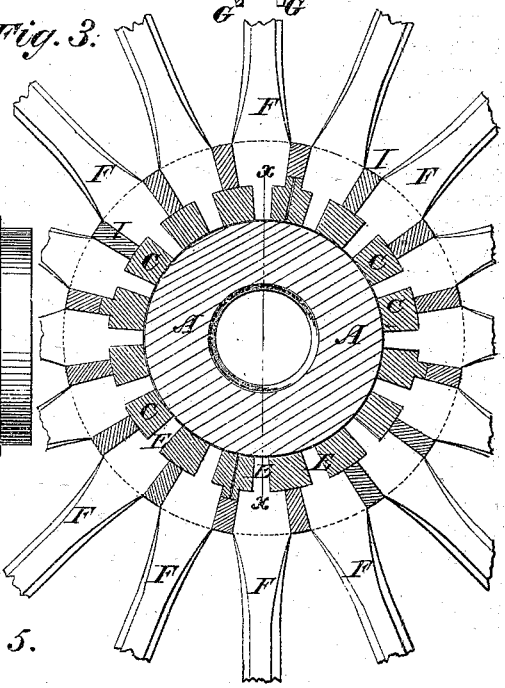
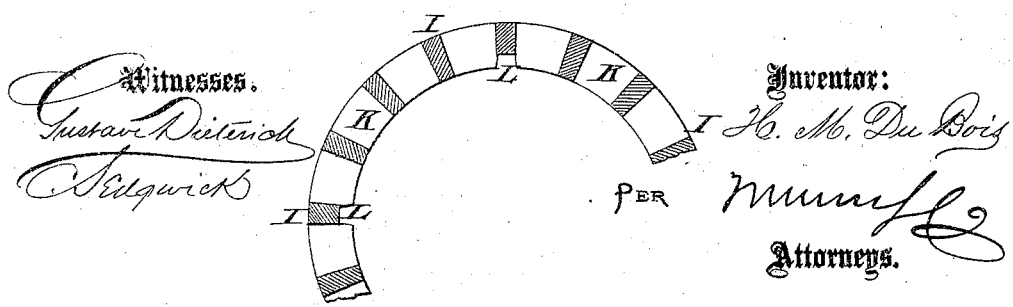

UNITED STATES PATENT OFFICE.

HOWARD M. DuBOIS, OF PHILADELPHIA, PENNSYLVANIA, ASSIGNOR TO HIMSELF AND W. FILTER, OF SAME PLACE.

IMPROVEMENT IN HUBS FOR VEHICLES.

Specification forming part of Letters Patent No. 135,470, dated February 4, 1873.

*To all whom it may concern:*

Be it known that I, HOWARD M. DuBOIS, of Philadelphia, in the county of Philadelphia and State of Pennsylvania, have invented a new and Improved Wagon-Wheel Hub, of which the following is a specification:

My invention consists of a wood hub with a deep groove with sloping sides turned in at the center, in which is fitted a metal mortise-ring in two semicircular parts, whose mortises are to receive the ends of the tenons, and over this another mortise-ring, for the ends of the spokes above the tenons, is shrunk on so as to bind very tightly on the inner ring and secure that firmly in the groove. The said inner ring has ribs or keys extending transversely across the face, for which grooves or notches are provided in the inner face of the outer ring, in which the keys wedge hard when it is shrunk on. They also cause the mortises of both rings to coincide.

Figure 1 is a longitudinal section of the hub and the inner mortise-ring. Fig. 2 is a side elevation of the hub with both rings and some of the spokes, each ring having a piece broken out. Fig. 3 is a section of the hub and rings taken on the line *y y* of Fig. 2. Fig. 4 is partly a section and partly a side elevation of the inner mortise-ring, and Fig. 5 is a section of the outer mortise-ring.

Similar letters of reference indicate corresponding parts.

A is the wood hub; B, the annular groove, turned in it at the center, with sloping sides. C represents the inner metal mortise-ring in two semicircular parts, with mortises D for the tenons E on the inner ends of the spokes F; also with transverse ribs or keys G on the periphery. This ring has beveled sides corresponding to the sloping sides of the groove, and it is suitably shaped to fill the groove and have its periphery flush with or slightly higher than the surface of the hub. I is the outer metal ring. It is complete in one piece; has large mortises K for the ends of the spoke above the tenons; also transverse grooves or key-seats L for the ribs or keys G; and is suitably constructed to shrink on the inner ring and bind it to the hub very tightly.

These rings, it will be seen, afford great strength, so the spokes can be driven as hard as they have strength to bear, and thus make a strong and durable wheel.

Having thus described my invention, I claim as new and desire to secure by Letters Patent—

A wooden hub having annular groove B turned in at the center with sloping sides, combined with the two-part metallic side-beveled mortise-ring C having spoke-mortises D and transverse ribs G, and with the outer metallic ring I having large mortises K and transverse grooves L, as and for the purpose described.

HOWARD M. DuBOIS.

Witnesses:
    SAM. H. DAVIS, Jr.,
    SAMUEL WATSON.